(12) United States Patent
Singh et al.

(10) Patent No.: US 9,124,448 B2
(45) Date of Patent: Sep. 1, 2015

(54) METHOD AND SYSTEM FOR IMPLEMENTING A BEST EFFORTS RESEQUENCER

(75) Inventors: Atul Singh, Gorakhpur (IN); Maneesh Joshi, Palo Alto, CA (US); Ashwin Patel, Sunnyvale, CA (US); Annaji Rao Garimella, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 12/418,585

(22) Filed: Apr. 4, 2009

(65) Prior Publication Data

US 2010/0254389 A1    Oct. 7, 2010

(51) Int. Cl.
    *H04L 12/56*    (2006.01)
    *H04L 12/58*    (2006.01)

(52) U.S. Cl.
    CPC ............ *H04L 12/5885* (2013.01); *H04L 51/34* (2013.01)

(58) Field of Classification Search
    None
    See application file for complete search history.

(56) References Cited

U.S. PATENT DOCUMENTS

| | | | |
|---|---|---|---|
| 5,502,840 A | 3/1996 | Barton | |
| 5,761,659 A | 6/1998 | Bertoni | |
| 5,892,954 A | 4/1999 | Tomas et al. | |
| 6,253,326 B1 * | 6/2001 | Lincke et al. | 726/12 |
| 6,594,774 B1 | 7/2003 | Chapman et al. | |
| 6,618,373 B1 | 9/2003 | Subramaniam | |
| 6,691,194 B1 | 2/2004 | Ofer | |
| 6,693,921 B1 * | 2/2004 | Whitfield | 370/516 |
| 6,744,765 B1 | 6/2004 | Dearth et al. | |
| 6,751,238 B1 * | 6/2004 | Lipp et al. | 370/541 |
| 6,775,235 B2 | 8/2004 | Datta et al. | |
| 6,775,305 B1 * | 8/2004 | Delvaux | 370/535 |
| 6,832,261 B1 * | 12/2004 | Westbrook et al. | 709/236 |
| 6,868,466 B2 * | 3/2005 | Connor | 710/260 |
| 7,080,046 B1 | 7/2006 | Rezvani et al. | |
| 7,149,798 B2 | 12/2006 | Rezvani et al. | |
| 7,280,524 B2 * | 10/2007 | Muller et al. | 370/349 |
| 7,406,523 B1 * | 7/2008 | Kruy et al. | 709/227 |
| 7,454,696 B2 | 11/2008 | Kuznetsov et al. | |
| 7,516,166 B2 | 4/2009 | Normington | |
| 7,554,920 B2 * | 6/2009 | Alam et al. | 370/236 |
| 7,613,110 B1 * | 11/2009 | Blair | 370/230 |
| 7,633,944 B1 | 12/2009 | Chang et al. | |
| 7,715,314 B2 | 5/2010 | Igarashi et al. | |
| 7,746,786 B2 * | 6/2010 | Ohishi et al. | 370/236 |
| 7,751,404 B2 * | 7/2010 | Pullen et al. | 370/394 |
| 7,801,145 B2 * | 9/2010 | Xia et al. | 370/394 |
| 7,814,218 B1 | 10/2010 | Knee et al. | |
| 8,213,311 B2 | 7/2012 | Pan et al. | |
| 8,301,940 B2 | 10/2012 | D'Alo et al. | |
| 8,458,517 B1 | 6/2013 | Vermeulen et al. | |

(Continued)

OTHER PUBLICATIONS

Non-Final Office Action dated Jan. 3, 2011 for U.S. Appl. No. 12/418,580.

(Continued)

*Primary Examiner* — Chirag Shah
*Assistant Examiner* — Steve Young
(74) *Attorney, Agent, or Firm* — Vista IP Law Group, LLP

(57) ABSTRACT

Described is an improved method, system, and computer program product for implementing an improved resequencer, along with related mechanisms and processes. A best efforts resequencing approach is described for determining a set of messages to process in a computing system.

24 Claims, 13 Drawing Sheets

(56) References Cited

U.S. PATENT DOCUMENTS

| | | |
|---|---|---|
| 2002/0152299 A1 | 10/2002 | Traversat et al. |
| 2002/0165929 A1 | 11/2002 | McLaughlin et al. |
| 2003/0046032 A1* | 3/2003 | Puthiyedath .................. 702/188 |
| 2003/0069902 A1 | 4/2003 | Narang et al. |
| 2003/0072310 A1 | 4/2003 | Reme |
| 2003/0126514 A1 | 7/2003 | Alam et al. |
| 2003/0200459 A1 | 10/2003 | Seeman |
| 2003/0214949 A1* | 11/2003 | Shaikli ........................ 370/394 |
| 2004/0003044 A1 | 1/2004 | Teoh et al. |
| 2004/0028049 A1 | 2/2004 | Wan |
| 2004/0064693 A1 | 4/2004 | Pabla et al. |
| 2004/0076178 A1 | 4/2004 | Botton |
| 2004/0186891 A1 | 9/2004 | Panec et al. |
| 2004/0193993 A1 | 9/2004 | Roy et al. |
| 2004/0230652 A1 | 11/2004 | Estrada et al. |
| 2004/0268062 A1 | 12/2004 | Ofer |
| 2005/0050109 A1 | 3/2005 | Klein |
| 2005/0149526 A1 | 7/2005 | Wiser |
| 2005/0182856 A1 | 8/2005 | McKnett |
| 2005/0207437 A1* | 9/2005 | Spitzer .......................... 370/412 |
| 2005/0209804 A1 | 9/2005 | Basso et al. |
| 2005/0216669 A1 | 9/2005 | Zhu et al. |
| 2005/0216770 A1* | 9/2005 | Rowett et al. .................. 713/201 |
| 2005/0273516 A1 | 12/2005 | Patrick et al. |
| 2005/0273772 A1 | 12/2005 | Matsakis et al. |
| 2006/0010371 A1 | 1/2006 | Shur et al. |
| 2006/0020911 A1 | 1/2006 | Lyons |
| 2006/0026378 A1 | 2/2006 | Sikdar et al. |
| 2006/0088060 A1* | 4/2006 | Fujikami et al. ............... 370/474 |
| 2006/0104279 A1* | 5/2006 | Fellman et al. ................ 370/392 |
| 2006/0106941 A1 | 5/2006 | Singhal et al. |
| 2006/0274727 A1 | 12/2006 | Musayev et al. |
| 2006/0282739 A1 | 12/2006 | Meyer et al. |
| 2007/0028001 A1 | 2/2007 | Phillips et al. |
| 2007/0039049 A1 | 2/2007 | Kupferman et al. |
| 2007/0168301 A1 | 7/2007 | Eisner et al. |
| 2007/0177579 A1 | 8/2007 | Diethorn et al. |
| 2007/0192402 A1 | 8/2007 | Dean, Jr. |
| 2007/0211640 A1 | 9/2007 | Palacharla et al. |
| 2007/0214381 A1 | 9/2007 | Goyal et al. |
| 2007/0214457 A1 | 9/2007 | Goyal et al. |
| 2007/0239881 A1 | 10/2007 | Schneider et al. |
| 2007/0266170 A1 | 11/2007 | Mockett |
| 2007/0266386 A1 | 11/2007 | Kishan |
| 2008/0091679 A1 | 4/2008 | Herness et al. |
| 2008/0212588 A1* | 9/2008 | Yi et al. ........................ 370/394 |
| 2008/0239972 A1 | 10/2008 | Omar |
| 2008/0243579 A1 | 10/2008 | Dan |
| 2008/0243847 A1 | 10/2008 | Rasmussen |
| 2008/0263549 A1 | 10/2008 | Walker |
| 2009/0080406 A1 | 3/2009 | Gopal et al. |
| 2009/0116489 A1* | 5/2009 | Hanks .......................... 370/394 |
| 2009/0117925 A1 | 5/2009 | De Bonis et al. |
| 2009/0193286 A1 | 7/2009 | Brooks |
| 2009/0300644 A1 | 12/2009 | Lee et al. |
| 2009/0320030 A1 | 12/2009 | Ogasawara |
| 2010/0023521 A1 | 1/2010 | Arcese et al. |
| 2010/0030911 A1 | 2/2010 | Fairbairn |
| 2010/0046519 A1* | 2/2010 | Dan et al. ...................... 370/394 |
| 2010/0054268 A1 | 3/2010 | Divivier |
| 2010/0161573 A1 | 6/2010 | Chan et al. |
| 2010/0211682 A1 | 8/2010 | Capomassi et al. |
| 2010/0211829 A1 | 8/2010 | Ziskind et al. |
| 2010/0218033 A1 | 8/2010 | Safari et al. |

OTHER PUBLICATIONS

Non-Final Office Action dated Dec. 17, 2010 for U.S. Appl. No. 12/418,582.
Non-Final Office Action dated Jan. 24, 2011 for U.S. Appl. No. 12/418,583.
Non-Final Office Action dated Mar. 30, 2011 for U.S. Appl. No. 12/418,588.
Final Office Action dated Nov. 9, 2011 for U.S. Appl. No. 12/418,588.
Advisory Action dated Jun. 30, 2011 for U.S. Appl. No. 12/418,580.
Final Office Action dated Jun. 9, 2011 for U.S. Appl. No. 12/418,582.
Advisory Action dated Oct. 7, 2011 for U.S. Appl. No. 12/418,583.
Final Office Action dated Jul. 6, 2011 for U.S. Appl. No. 12/418,583.
Final Office Action dated Apr. 28, 2011 for U.S. Appl. No. 12/418,580.
Non-Final Office Action dated Jan. 4, 2012 for U.S. Appl. No. 12/418,583.
Final Office Action dated Nov. 25, 2011 for U.S. Appl. No. 12/418,580.
Non-Final Office Action dated Mar. 7, 2012 for U.S. Appl. No. 12/418,588.
Notice of Allowance and Fees Due dated Apr. 26, 2012 for U.S. Appl. No. 12/418,583.
Non-Final Office Action dated Sep. 11, 2012 for U.S. Appl. No. 12/418,580.
Final Office Action dated Oct. 23, 2012, for U.S. Appl. No. 12/418,588.
Final Office Action dated Jan. 18, 2013, for U.S. Appl. No. 12/418,580.
Advisory Action dated Mar. 13, 2013, for U.S. Appl. No. 12/418,588.
Notice of Allowance and Fees Due dated Oct. 3, 2013 for U.S. Appl. No. 12/418,582.
Notice of Allowance and Fees Due dated Jun. 28, 2013 for U.S. Appl. No. 12/418,588.
Non-final Office Action dated Jan. 29, 2014, for U.S. Appl. No. 12/418,580.
Corrected Notice of Allowance dated Jan. 28, 2014, for U.S. Appl. No. 12/418,582.
Final Office Action dated May 22, 2014 for U.S. Appl. No. 12/418,580.

* cited by examiner

METHOD AND SYSTEM FOR IMPLEMENTING A BEST EFFORTS RESEQUENCER

CROSS-REFERENCE TO RELATED APPLICATIONS

The present application is related to (i) co-pending application Ser. No. 12/418,580, entitled "METHOD AND SYSTEM FOR APPLYING EXPRESSIONS ON MESSAGE PAYLOADS FOR A RESEQUENCER", (ii) application Ser. No. 12/418,582, entitled "METHOD AND SYSTEM FOR IMPLEMENTING SEQUENCE START AND INCREMENT VALUES FOR A RESEQUENCER", (iii) application Ser. No. 12/418,583, entitled "METHOD AND SYSTEM FOR PERFORMING BLOCKING OF MESSAGES ON ERRORS IN MESSAGE STREAM", and (iv) application Ser. No. 12/418,588, entitled "METHOD AND SYSTEM FOR IMPLEMENTING A SCALABLE, HIGH-PERFORMANCE AND FAULT-TOLERANT LOCKING MECHANISM IN A MULTI-PROCESS ENVIRONMENT", all filed on even date herewith, which are all hereby incorporated by reference in their entirety.

BACKGROUND AND SUMMARY

The invention is directed to an approach for implementing an improved resequencer, along with related mechanisms and processes.

Almost all types of computing systems use and implement the concept of messages. A message contains information which is sent from a source location or entity to a receiver location or entity. "Message passing" refers to a type of communications used by computing systems to send and exchange messages from sources to destinations.

When messages are sent from a source to a destination, it is possible that the messages may be delivered out of order. This may occur for many different reasons. For example, consider a set of messages to be delivered across the internet. Dynamic routing is often used to select the particular routes and intermediate nodes through which the messages are delivered from the source to the destination. Because of the dynamic nature of the routing, it is quite possible, and even likely, that the different messages within the set of messages are routed through different pathways, which cause the messages to be delivered at different times. As such, an earlier message in a set sequence may be delivered later in time than a later message within the sequence of messages. Multi-threaded processing may also correspond to messages in a stochastic order that are delivered or received.

If the messages are required to be delivered in a particular sequence to a downstream consumer, the easiest solution would be to make sure that they never get out of order in the first place. In effect, the message delivery patterns or the message paths are selected by the message originator or sender to guarantee that that the messages will always be delivered in a particular order.

However, there are many circumstances in which it is not possible to provide this guarantee of ordering for the messages at delivery. For example, a developer of a downstream component may be just a consumer of messages created by upstream components controlled by other parties, and therefore may not be able to affect or have a choice of how the upstream components implement controls for the order of messages. Thus, the need to implement a component that will reorder messages may arise. In the database application space, this is particularly a problem where application semantics require the messages to be delivered in a particular order.

A resequencer is an apparatus that may be used to deliver incoming messages in a user-specified order to the consumer. The user specifies the new order (or the correct sequence) of the incoming messages and the part of the incoming message that is the sequence identifier of the message. Typically, the sequence identifier is the value of a well-known property in the message header. The sequence identifier and the correct sequence are used to decide on the position of the incoming message in the outgoing message stream. The correct sequence could be something as simple as a sequence of consecutive numbers, such as "1, 2, 3 . . . " However if the sequence identifier is a non-contiguous space, such as time-based values, then deciding on the position of the incoming message in the outgoing stream is a challenge. This invention presents a solution for resequencing messages when the sequence identifier belongs to a non-contiguous space.

An example scenario in which there may be a need to reorder messages is in the implementation of an Enterprise Service Bus (ESB). The enterprise service bus is a relatively recent development in the computing industry, in which the ESB provides a message-based infrastructure for routing and passing messages between applications. The ESB can be used in conjunction with service-oriented architectures (SOA), which are architectures that define applications which provide functionality based upon re-usable services or applications. The SOA therefore allows very complex business functions to be performed based upon the interaction and interplay between multiple applications. The ESB supports SOA by including sufficient messaging and interconnectivity functionality to allow resources and applications to work together across wide networks.

The ESB architecture creates a situation in which there may exist multiple senders and multiple consumers of messages. Particularly relevant for the present application is the fact that the ESB architecture creates a situation in which the message consumer may not have control over the order in which the messages are sent from the message sender to the message consumer. This situation may exist with other types of middleware architectures as well.

Embodiments of the present invention provide an improved approach for implementing and configuring a resequencer that can efficiently and effectively order messages to be delivered to a message consumer. A best efforts resequencing approach is described for determining a set of messages to process in a computing system. The present embodiments are particularly useful to provide message ordering for ESB architectures and systems. Other and additional objects, features, and advantages of the invention are described in the detailed description, figures, and claims.

BRIEF DESCRIPTION OF FIGURES FOR EMBODIMENTS OF THE INVENTION

DETAILED DESCRIPTION OF EMBODIMENTS

As noted above, in many message-based systems, it is possible for messages to be sent from a message creator to a message consumer in a sequence where the messages are delivered out-of-order. If, however, the message consumer expects the messages to be in a particular order, then the out-of-order message sequence could cause computing errors or other failures to occur at or by the message consumer.

Figure 1:
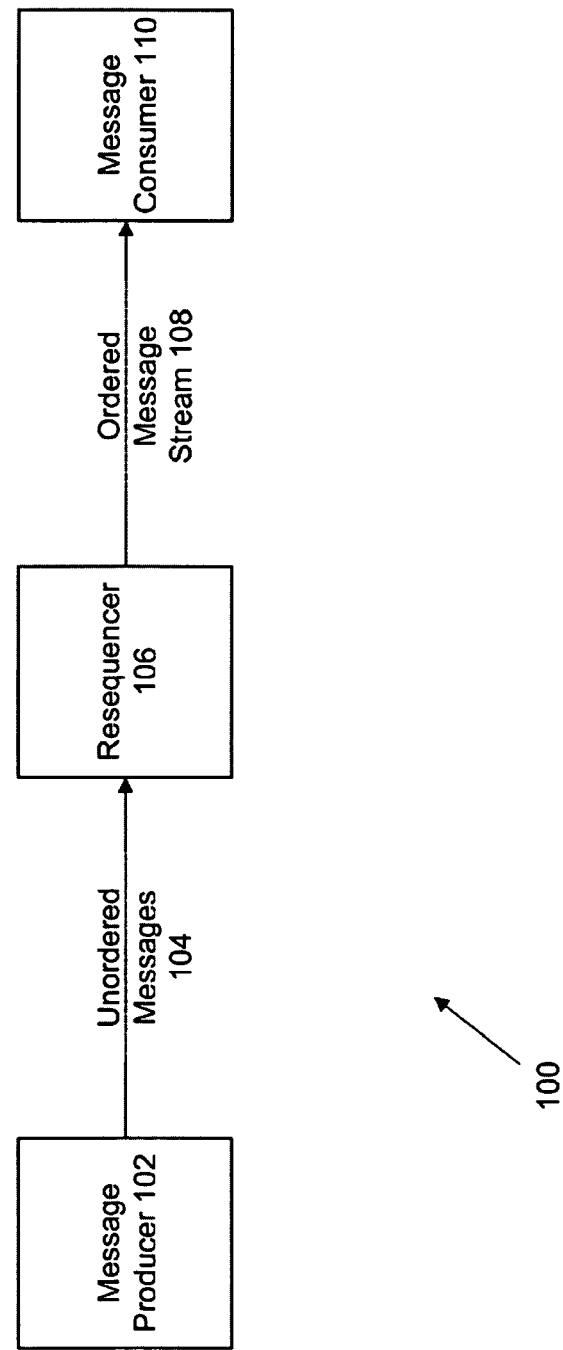
FIG. 1 illustrates a flow of un-ordered incoming messages to a resequencer, and the generation of an outbound ordered stream of messages from the resequencer according to some embodiments of the invention.

FIG. 1 shows an architecture 100 of an example system that uses a resequencer according to some embodiments of the invention. The system may be, for example, an ESB architecture comprising one or more middleware applications that interconnect applications to users of the applications, where messages are passed from upstream components to downstream components of the architecture 100.

A message producer 102 generates one or more messages 104 that may be sent from the message producer 102 in an unknown order in the direction of a message consumer 110. A resequencer 106 intercepts the unordered messages 104 for the message producer 102.

The resequencer 106 is an apparatus that can be used to deliver incoming messages in a user specified order. The resequencer 106 analyzes the unordered messages 104 to determine whether or not the messages 104 need to be resequenced. If so, then the resequencer 106 will re-order the messages 104 before sending the messages in order 108 to the message consumer 110.

Figure 2:
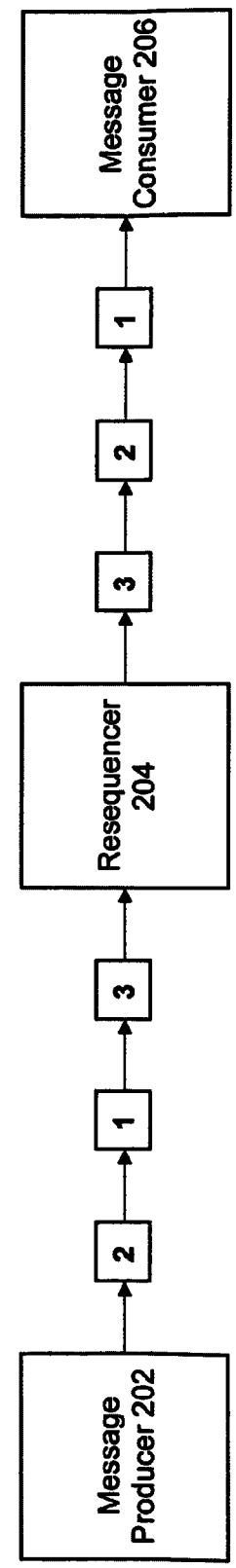
FIG. 2 illustrates resequencing of messages according to some embodiments of the invention.

FIG. 2 provides an illustration of this process for re-ordering messages. Assume that a set of messages are sent out-of-order from a message producer 204 to a message consumer 206. For example, the messages are intended to be in an ordered sequence where message 1 is first, then message 2, and then message 3 as the final message. However, due to reasons such as network routing or latency, the set of messages may actually be sent out-of-order where message 3 is sent first, then message 1, and finally message 2.

The resequencer 204 receives the messages 3, 1, 2 in the out-of-order sequence, and re-orders the messages to be in the correct sequence. The messages in the correct sequence will then be sent to the message consumer 206. Here, the messages will be sent in order of message 1 first, them message 2, and finally message 3 to the message consumer 206.

According to some embodiments of the invention, the payloads of the messages themselves will include information that may be used to decide the correct order of those message. The resequencer will use that information from the message payloads to determine the new position of the incoming message in the outgoing ordered messages stream that is delivered to the message consumer. More details regarding an example approach for performing this type of sequence analysis is described below.

In addition to the function of re-ordering messages, a resequencer may also provide the functionality of dividing the stream of incoming messages into sub-streams based on one or more groups that are associated with a message. This can provide faster performance as compared to single threaded resequencing operations that handle only a single stream of messages. Each of the substreams may comprise an independent set of messages that are to be ordered separately from other substreams of messages. Routing may be performed to deliver the substreams to the correct message consumer based upon the specific groups that is associated with each substream.

Figure 3:
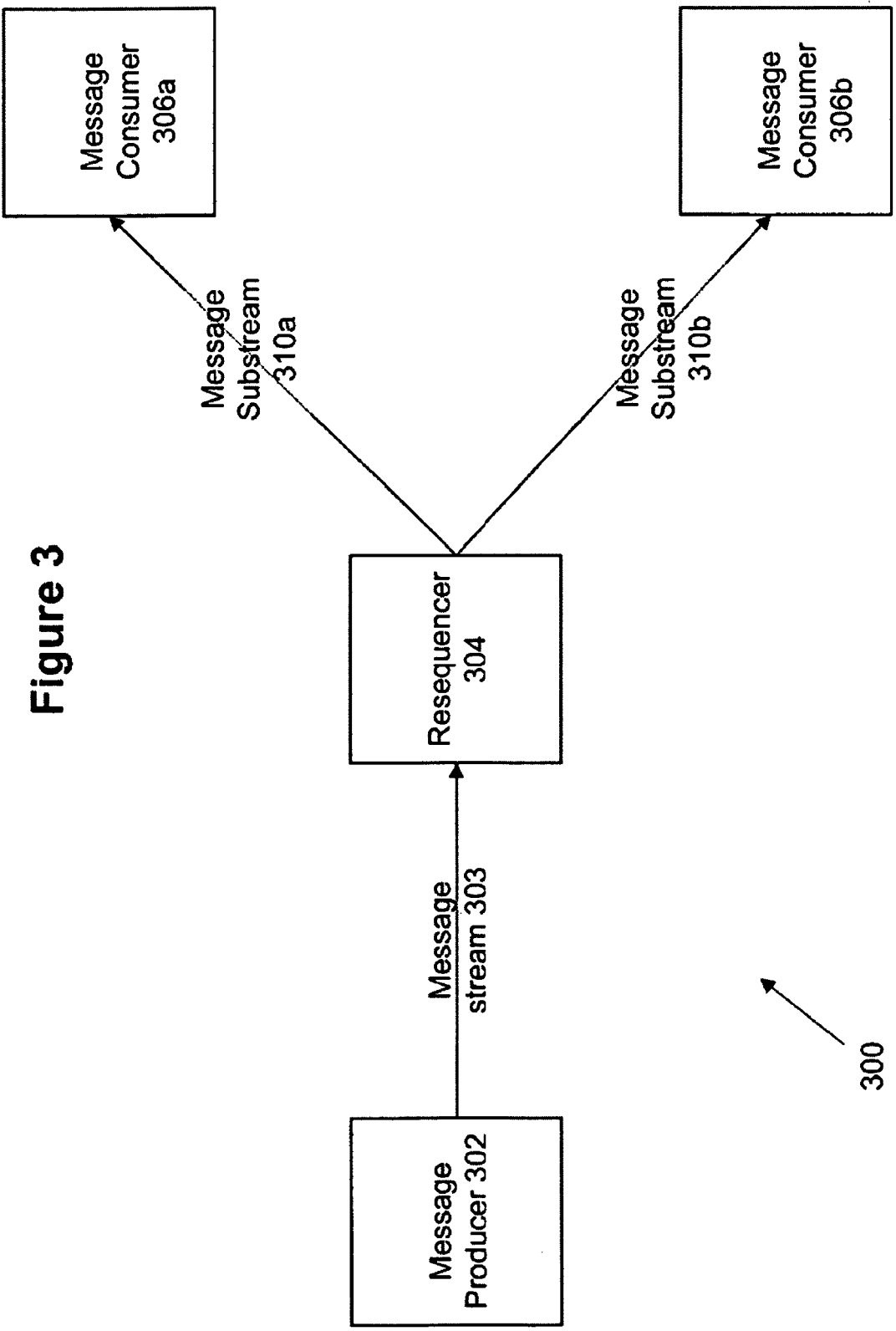
FIG. 3 illustrates a flow of message and the process of grouping messages into substreams of messages according to some embodiments of the invention.

FIG. 3 shows an architecture 300 of an example system for providing routing and grouping functionality with a resequencer according to some embodiments of the invention. A message producer 302 generates one or more messages 303 that may include multiple sets or groups of messages. In particular, the messages 303 may include multiple sets of messages intended for multiple message consumers 306a and 306b.

The resequencer 304 intercepts the message stream 303 before delivery to the message consumers 306a and 306b. The resequencer 304 will divide the message stream 303 into a set of multiple message substreams 310a and 310b. Each substream 310a and 310b will be independently ordered based upon sequencing criteria that may be different for different sub streams.

Once the message stream 303 has been divided into the substreams 310a and 310b, routing can be performed to deliver the substreams 310a and 310b to appropriate message consumers. Here, message substream 310a is delivered to message consumer 306a and message substream 310b is delivered to message consumer 306b.

Figure 4:
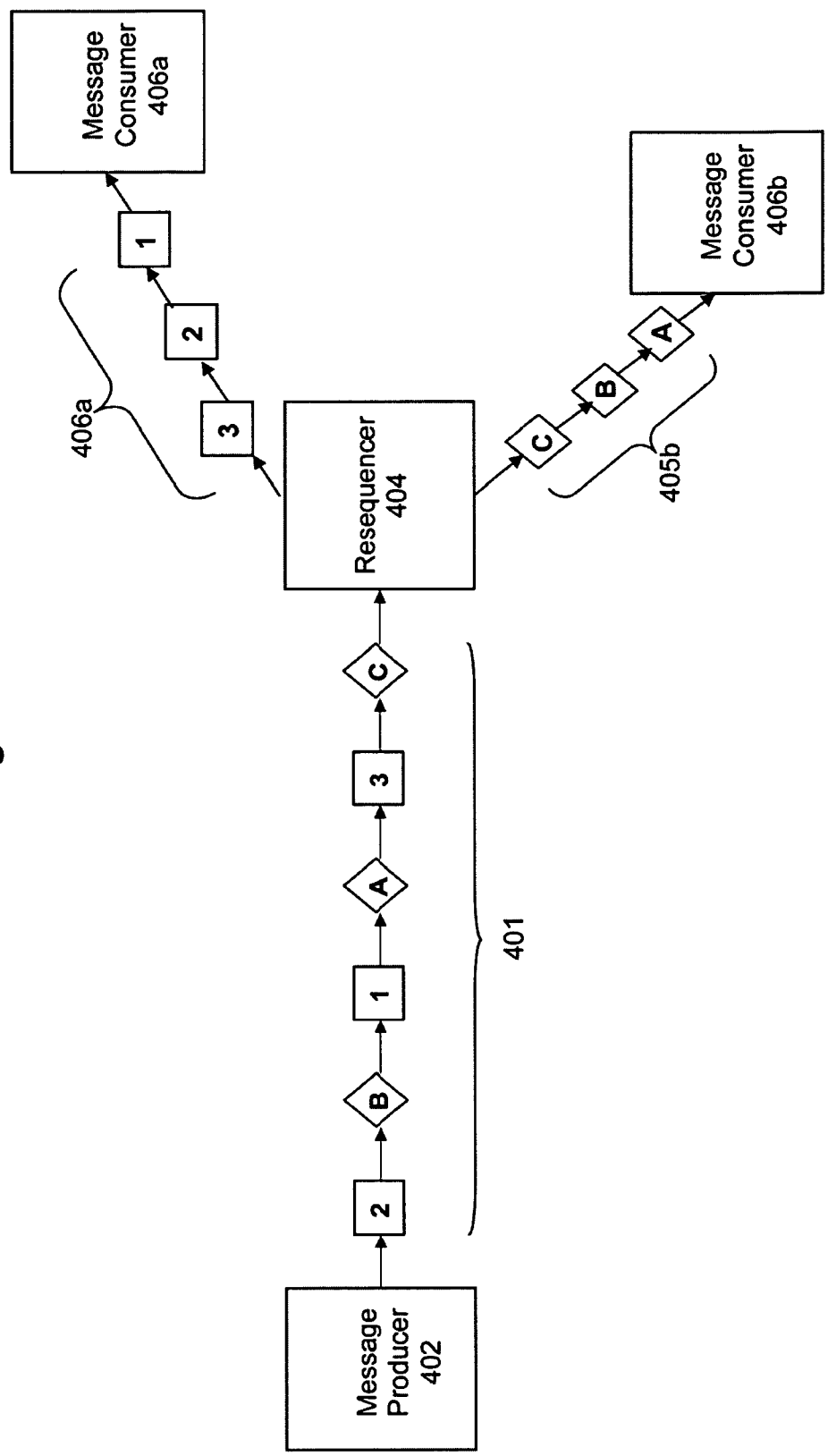
FIG. 4 illustrates grouping of messages into substreams according to some embodiments of the invention.

FIG. 4 provides an illustration of this process for subdividing a message stream. Assume that a message stream 401 containing multiple sets of messages is sent out-of-order from a message producer 402 to multiple message consumers 406a and 406b. For example, the message stream 401 is intended to be in two separate ordered sequences, where first message sequence includes a message 1 that is intended to be first, followed by a message 2 that is intended to be second, and then followed by a message 3 as the final intended message in the message sequence. The message stream 401 also includes a second message sequence that includes a message A that is intended to be first, followed by a message B that is intended to be second, followed by a message C that is intended to be last.

However, the message stream 401 may be sent where the messages for the two different substreams are mixed together in the message stream 401. Furthermore, the messages in the message stream 401 may be out-of-order. For example, as shown in the figure, message C may be sent first, followed by message 3, then message A, then message 1, followed by message B, and finally message 2.

The resequencer 404 receives the message stream 401 with the multiple mixed sequences, and sub-divides the message stream 401 into multiple substreams 405a and 405b based upon the specific group to which each message is associated. Assume that message consumer 405a is the intended recipient of the message group containing messages 1, 2, and 3 and message consumer 405b is the intended recipient of the message group containing messages A, B, and C. Here, resequencer generates the substream 405a that includes messages 1, 2, and 3 and generates substream 405b that includes messages A, B, and C. The resequencer 404 routes substream 405a containing messages 1, 2, and 3 to message consumer 405a and routes substream 405b containing messages A, B, and C to message consumer 405b.

Each of the substreams 405a and 405b are also correctly ordered before delivery to the message consumers 405a and 405b. Here, message substream 305a includes messages that arrived at the resequencer 404 in the order of message 3 first, then message 1 next, and finally message 2 last. These messages are reordered such that the message substream 305a delivered to message consumer 406a includes the messages in order of message 1 first, then message 2, and finally message 3 last. Similarly, message substream 305b includes messages that arrived at the resequencer 404 in the order of message C first, then message A next, and finally message B last. These messages are reordered such that the message substream 305a delivered to message consumer 406a includes the messages in order of message A first, then message B, and then finally message C last.

Figure 5:
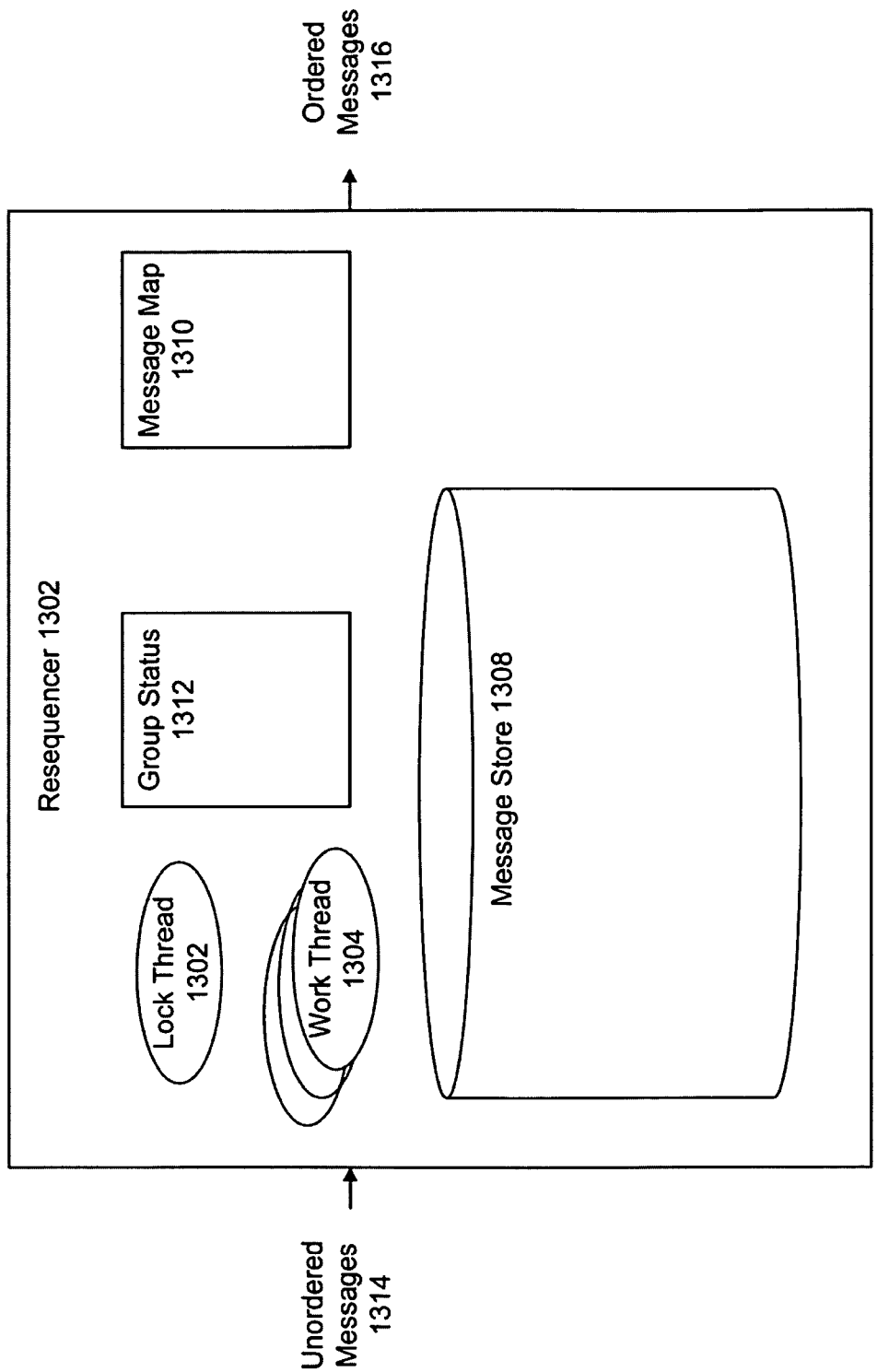
FIG. 5 illustrates internal structures for a resequencer according to some embodiments of the invention.

FIG. 5 shows the internal architecture of a resequencer 1302 according to some embodiments of the invention. The resequencer 1302 performs work using any suitable processing entity (e.g., threads, processes, or tasks) which is hereinafter referred to as "threads". The threads perform the work of processing incoming messages 1314 received from upstream components to create one or more ordered sets of messages 1316 for deliver to downstream components. Multiple types or categories of threads maybe employed in conjunction with the resequencer 1302. For example, worker threads 1304 may be employed to perform the actual work of analyzing and sequencing messages. Lock threads 1302 may be used to handle locking of resources to avoid inconsistent access or changes to data. Other and additional types of threads may also be employed in conjunction with the invention. For example, as described in a section further below in this document, "heartbeat" threads may be employed to check the status of other threads, and to perform error handling upon the failure of other threads.

Messages that are received by the resequencer are stored in a message store 1308. The message store 1308 may comprise any type of hardware/software structure that is capable of storing a set of messages. According to some embodiments, the message store 1308 is a relational database product that stores data onto a hardware-based computer storage medium. An exemplary database product that may be used to implement the message store 1308 is the Oracle 11G database product, available from Oracle Corporation of Redwood Shores, Calif. The message store 1308 may be an internal component of the resequencer 1302, or it may be implemented as a mechanism that is external to the resequencer 1302.

The resequencer comprises a group status structure 1312 that stores status information for the different groups of messages corresponding to the different substreams undergoing processing by the resequencer 1302. Such status information includes, for example, information about the last message that was sent for the group such as sequence identifier information and timestamp information. The information can be used to decide the next message that should be delivered.

The message map can be used to find a message given a group identifier and a sequence identifier. A message map 1310 contains information about the messages received by the resequencer 1302, e.g., the messages received and stored in the message store 1308. Information that could be stored in the message map 1310 includes, for example, the group identifier and sequence identifier for the messages.

Figure 6:
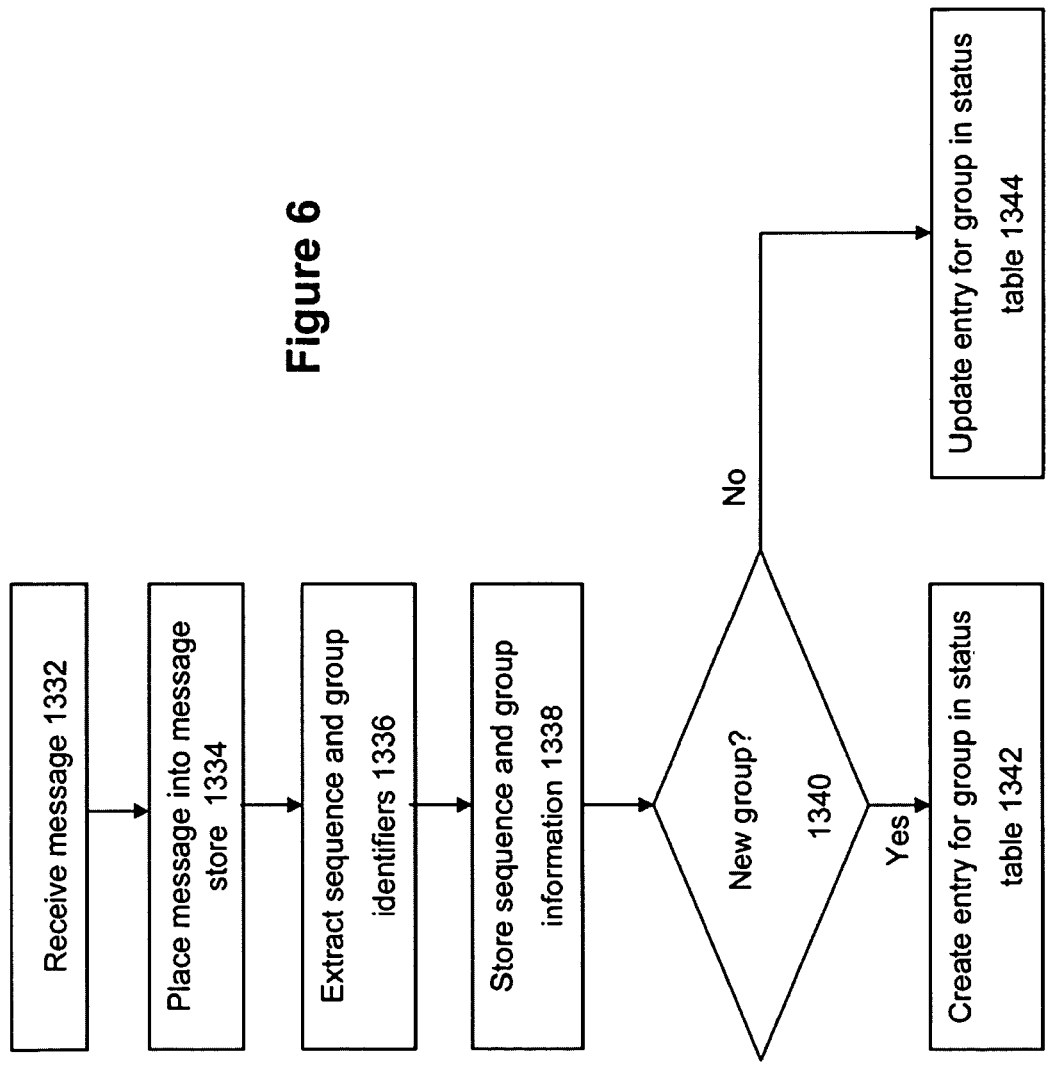
FIG. 6 shows a flow of a process for processing a message according to some embodiments of the invention.

FIG. 6 shows a flow of a process for handling incoming messages received by the resequencer using the architecture of FIG. 5, which is also referred to as the "enqueue" process for new messages. At 1332, an incoming message from a message producer is received by the resequencer. When a message arrives at the resequencer, that message is placed for storage into the message store (1334).

At 1336, the sequence and group identification information are extracted for the message. According to some embodiments, XPath expressions are applied to extract this information from the message payload of eXtensible Markup Language (XML) based messages, where the sequence and group information are stored within nodes or fields of the XML-based messages. The message map is modified to include an entry for the new message. The extracted group and sequence information is stored within the entry for the new message in the message map (1338).

A determination is made at 1340 whether the new incoming message corresponds to an existing group already recognized at the resequencer, or whether the message corresponds to a new group that has not yet been processed by the resequencer. If the message corresponds to a new group identifier, then a new entry is created in the group status structure for the group identifier (1342). On the other hand, if the message corresponds to a known group identifier which already has an entry in the group status structure, then a new entry does not needs to be created in that structure for the new message. Instead, the arrival of the message may cause a change in group status that could require a modification of the entry for that group in the group status structure, e.g., a change to the timestamp of a latest message to be sent out for subsequent delivery.

Figure 7:
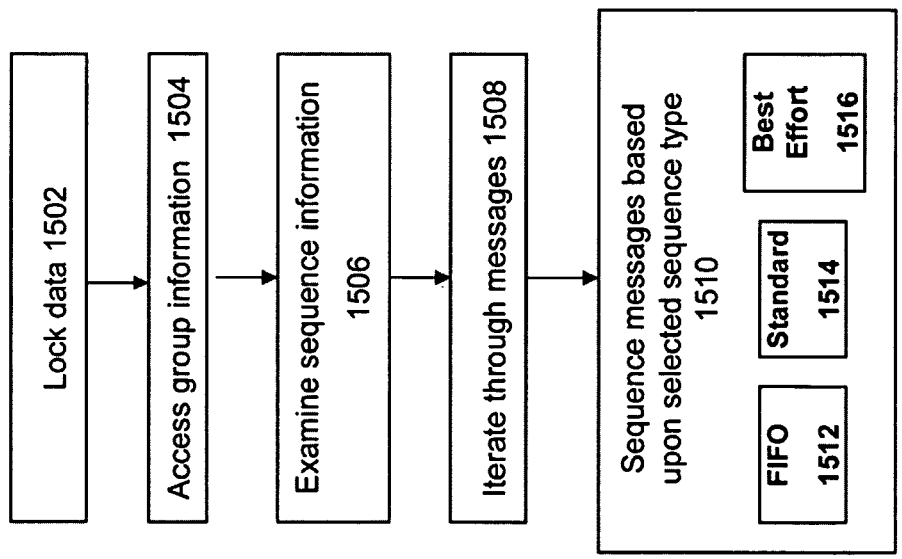
FIG. 7 shows a process for handling messages for sequencing according to some embodiments of the invention.

FIG. 7 shows a flow of a process for processing messages by the resequencer after the messages have been enqueued by the process of FIG. 6 (also referred to as the "dequeue" process). The process is performed on a group-by-group basis to avoid creating inconsistencies in the message data. Therefore, at 1502, a lock thread locks the metadata associated with the particular group being handled. Any suitable locking approach may be employed within the scope of the invention. According to some embodiments, a lock column is implemented within the group status table, where the lock thread uses the lock column to exclusively lock the group metadata such that only one worker thread at a time can hold the lock and be permitted to operate upon the group. The group identifier can be placed into a shared queue, where a worker thread can then obtain that group identifier to begin processing.

At 1504, the worker thread accesses the group status table to obtain the latest status information for the group being operated upon. Such status information includes, for example, information about the last message that was delivered to a downstream component for that group, such as the sequence identifier or timestamp for that last delivered message. According to one embodiment, after the group is locked, it is at this point that the worker thread accesses the information tion places it into the shared queue.

At 1508, the worker thread uses the group status information to iterate through the messages in the message store to identify the next one or more messages from the message store that should be sequentially processed for delivery to downstream components. The messages are processed based upon any number of different sequence methodologies (1510). Examples of different sequencing methodologies that may be employed in conjunction with embodiments of the invention include first-in-first-out (FIFO) sequencing 1512, standard ordered sequencing 1514, and best efforts sequencing 1516.

Figure 8:
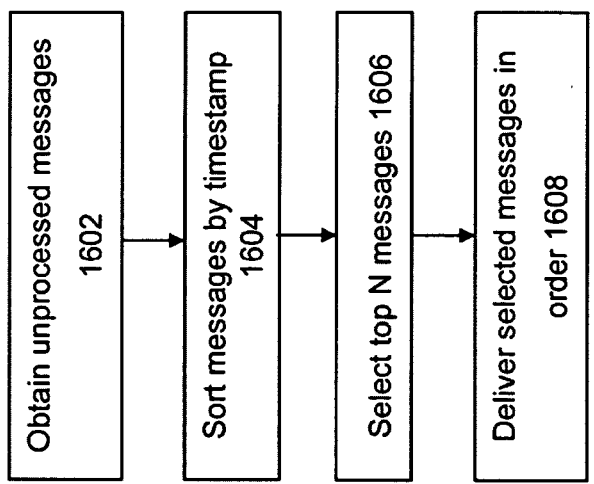
FIG. 8 shows a flow of a process for performing FIFO sequencing according to some embodiments of the invention.

FIFO sequencing generally refers to a sequencing approach in which messages are processed in the order in which they arrive. FIG. 8 shows an example process that may be used to implement FIFO sequencing. The process begins by obtaining the unprocessed messages for the particular group under examination (1602). This can be accomplished by searching through the message store for any messages corresponding to the group identifier for the group being processed. The message map can be used to identify the messages, since it includes group identifier information that allows searching and mapping of the messages that correspond to a specific group identifier.

Next, at 1604, the unprocessed messages for the group are sorted in the order of their arrival times (1604). On approach for performing this sorting task is to sort the messages based upon their incoming timestamps.

At 1606, a set of one or more messages are selected to be delivered. Any number of messages may be selected for delivery to the downstream components. However, given the expense of perform database and message processing operations, it is often more efficient to process multiple messages at the same time for delivery. Therefore, at 1606, the top N messages will normally be selected for delivery, where N corresponds to a suitably efficient number of messages to be processed, depending upon the specific system, network, and environmental parameters for the system with which the resequencer is implemented. By appropriately configuring N the resequencer provides load balancing, The selected messages are then delivered in the FIFO order at 1608.

Figure 9:
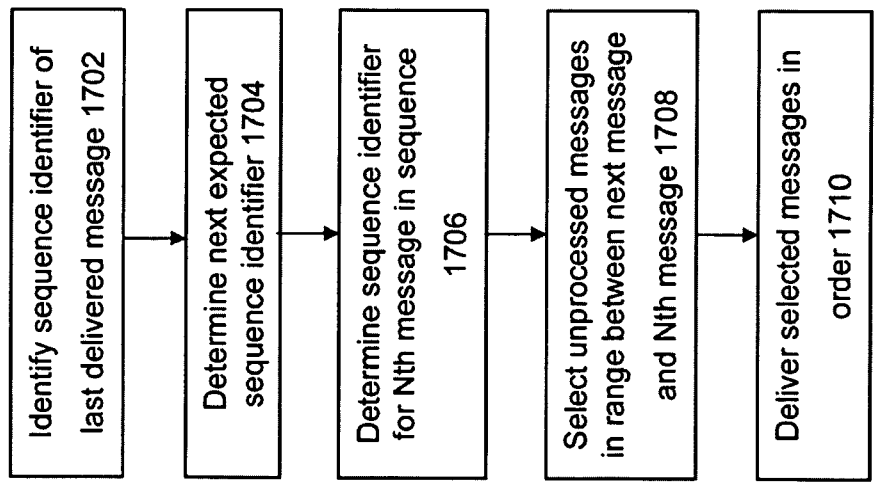
FIG. 9 shows a flow of a process for performing standard sequencing according to some embodiments of the invention.

Standard sequencing is performed sequencer a set of messages in a standard numerical or user-specified order. FIG. 9 shows an example process that may be used to implement standard sequencing. The process begins by identifying the last message for the group that was delivered to the downstream components (1702). The group status table can be accessed to obtain this information, including the sequence identifier for that last message which was delivered.

At 1704, a determination is made of the sequence identifier for the next message in the specified ordering of messages. For example, if the messages are numerically ordered in sequence, and if the last message that was delivered was message number "2", then the next expected message to deliver will have a sequence number of "3". If no previous message has yet been delivered for the group, then the next sequential messages for the present processing should be the message corresponding to the very first sequence number/identifier.

As previously discussed, any number of messages may be selected for delivery to the downstream component, since given the expense of perform database and message processing operations, it is often more efficient to process multiple messages at the same time for delivery. Therefore, at 1706, the sequence identifier for the Nth message in the sequence of messages is identified, where N corresponds to a suitably efficient number of messages to be processed, depending upon the specific system, network, and environmental parameters for the system with which the resequencer is implemented.

At 1708, a selection is made of the unprocessed messages corresponding to sequence identifiers that are in the range from the next expected message (identified at 1704) to the Nth message (identified at 1706). The message map can be searched to identify the messages for a given group having sequence identifiers in this range. The selected messages are retrieved from the messages store, and are delivered at 1710 to the downstream components.

Best efforts sequencing is another sequencing approach that can be used to group messages together for delivery. It is often desirable to wait until the entire set of messages is collected together before undergoing processing. This avoids the situation in which an important message is left out from the group processing because it arrives later than the other messages.

The problem is that it is often difficult or impossible to know if there are any messages that are missing from the set of messages to be processed. This is because there may be a non-contiguous sequence of identifiers for the messages in the message stream. For example, consider a set of messages in which the messages are created with a timestamp as the sequence identifier. A first message arrives that has 1:00 PM as its sequence identifier and a second message arrives that has 1:02 PM as the second message's sequence identifier. Because these are non-contiguous identifiers, it is completely unknown whether or not there are any other messages that may be arriving which correspond to a timestamp between 1:00 PM and 1:02 PM.

Because it is unknown whether any further messages will arrive for the group, it becomes very impractical to wait for an unlimited period of time for additional messages to arrive. One possible approach to address this problem is to implement a skip on time out facility to handle non-contiguous identifier sequences. In this approach, the non-contiguous sequence is approximated by a contiguous sequence. The resequencer waits for every identifier in the contiguous sequence for a configurable time-out period. If the resequencer does not receive a message with the specific sequence identifier in the time-out period then it presumes that message will never arrive and moves over to handle message with the next identifier in the sequence. Another approach is to wait for N time units to create a batch of messages. The resequencer sorts the messages in the batch on the sequence identifier and processes the messages in the increasing order of the sequence identifier. The problem with these approaches is that they ignore a key characteristic often seen in messages, where the messages are delivered in a somewhat "bursty" in nature, in which multiple individual messages that are linked together are sent over the network over a very short duration of time. Therefore, a static time-out or N unit waiting facility may fail to catch all the late messages if the burst of messages begin arriving towards the tail end of the time-out or waiting periods.

According to some embodiments of the invention, the problem is addressed by keeping a time window open for new messages if a new message is received during the duration of that time window. If no new messages are received in the time window, then the window is closed and the messages already received are processed. If, however, any new messages are received while the window is open, then the time window restarts and waits for additional new messages.

This approach is based upon the resequencer creating a batch of messages that are ready to be processed. The batch of messages is processed if no new messages are received in N time units after the last message in the batch. The resequencer sorts the messages in this batch on the sequence identifier, picking up the messages with the smallest sequence identifier and processes it for delivery. According to some embodiments, the resequencer will wait for every identifier in the contiguous sequence for a configurable time-out period. If the resequencer does not receive a message with the specific sequence identifier in the time-out period then it presumes that message will never arrive and moves over to handle the message with the next identifier in the sequence.

Figure 10:
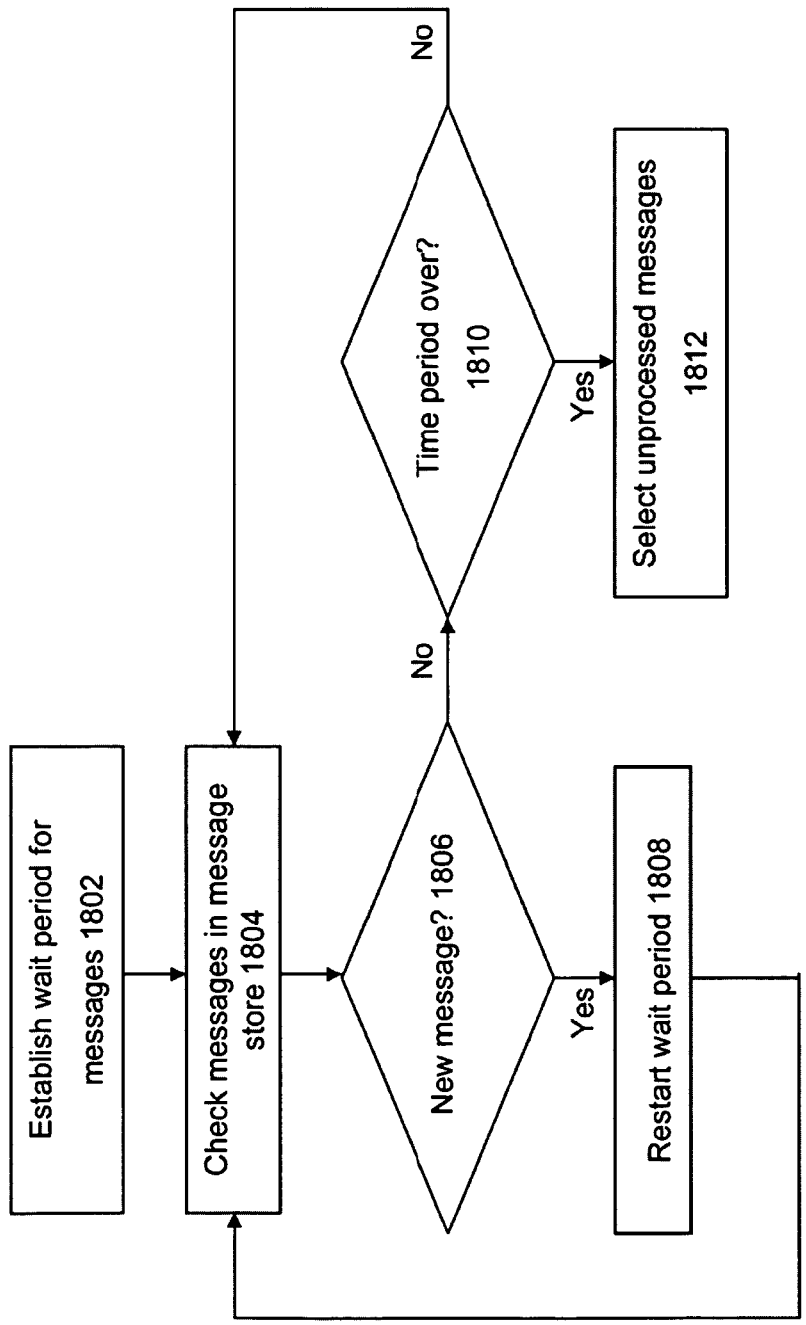
FIG. 10 shows a flow of a process for performing best efforts sequencing according to some embodiments of the invention.

FIG. 10 shows a flow of a process for implementing best efforts sequencing according to some embodiments of the invention. At 1802, a waiting period of N time units is selected for the best efforts sequencing. Any suitable number of time units can be selected for the waiting period.

At 1804, a check is performed to determine if any new messages have been received for the group under examination. This check can be accomplished by analyzing the message store to see if new messages have been received and deposited into the message store. Alternatively, the message map can be reviewed to identify if any messages having a recent timestamp has been received and entered as a new entry in the message map. If any new messages have been identified at 1806, then the waiting period is restarted at 1808 to allow further waiting for new messages.

If no new messages have been received, then a check of the time period is made at 1810. If the time period is not yet over, then the process returns back to 1804 to continue to check for new messages. A suitable waiting period may occur before returning back to 1804 to check for new messages. If the time period has completed without any new messages, then at 1812, the unprocessed messages that have already arrived are selected for processing and delivery.

The present best efforts approach provides a sequencing approach that much more closely approximates real-life usage pattern of messages, where sets of messages are generated in a short period of time and send to the resequencer for ordered delivery. The solution provides better performance compared to the approach of approximating the non-contiguous sequence with a contiguous sequence.

Figure 11A:
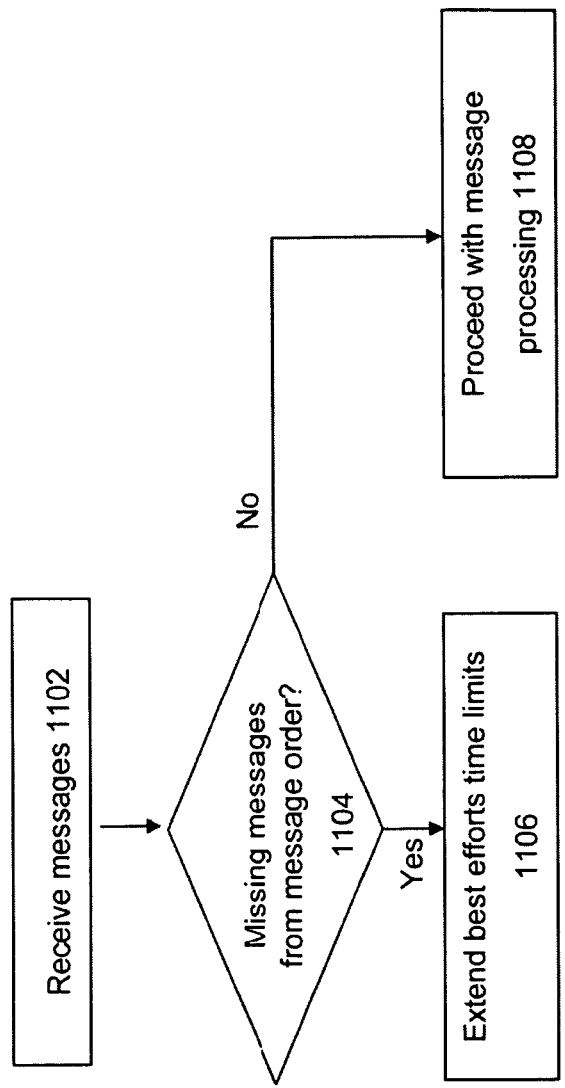
FIGS. 11A and 11B show flowcharts of processes for using smart filters according to some embodiments of the invention.

According to some embodiments, a smart filter can be implemented to extend the best efforts time period under certain conditions. FIG. 11A shows a flowchart of a process for using smart filters according to some embodiments of the invention. At 1102, the messages are received, as described above. At 1104, the process of FIG. 11A checks for the presence of any missing messages in the local message store, which may be caused, for example, by having messages arrive out-of-sequence. For example, a sequence of messages may require a first message in the sequence to be a "Create" operation, followed in sequence by an "Update" operation message, and followed by a "Delete" operation message. If the local message store only includes the "Update" and "Delete" messages and has not yet received the "Create" message, then it is clear that the messages have arrived out of order, but that it is likely the "Create" message will be arriving in the near future.

Upon detection of this circumstance, then at 1106, the best efforts time period can be extended until the missing message has been received. If there is no detection of a missing message at 1104, then the resequencer proceeds with processing of the messages at 1108.

Figure 11B:
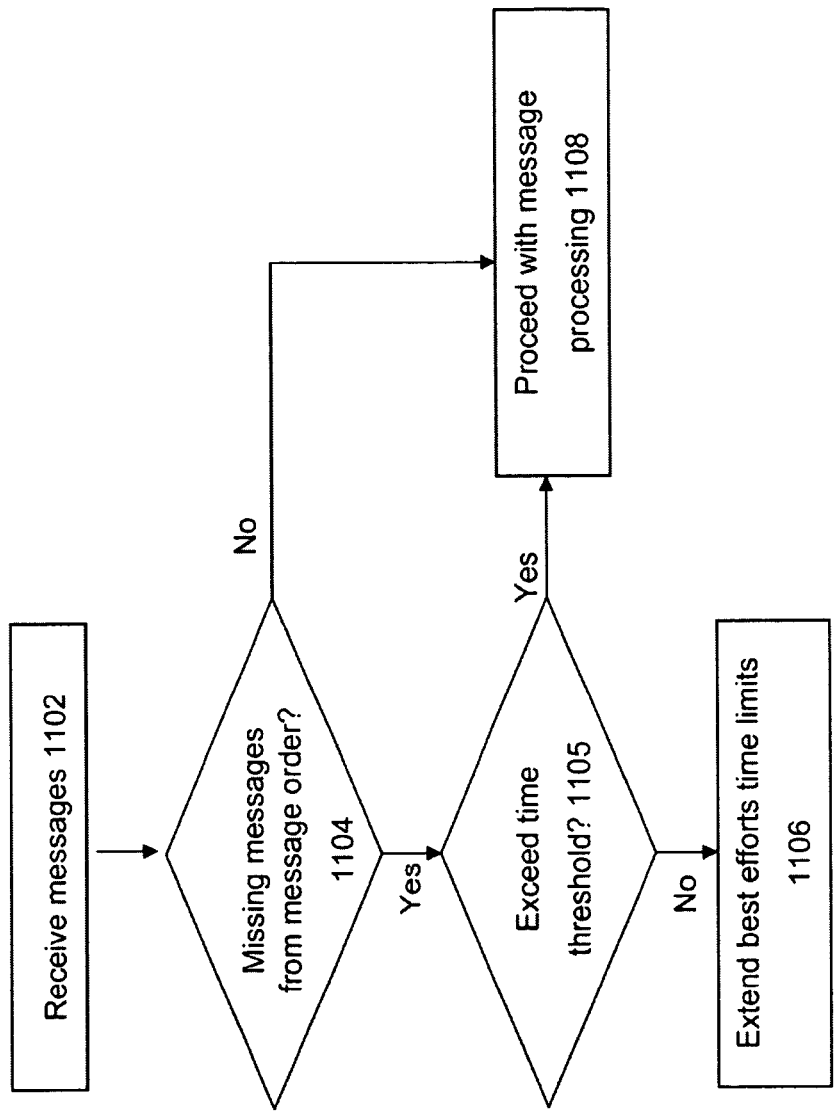

FIG. 11B shows an alternate approach to using a smart filter. As before, messages are received at 1102 and the process at 1104 checks for the presence of any missing messages in the local message store.

The difference between the processes of FIGS. 11A and 11B is that according to the alternate embodiment of FIG. 11B, a threshold time limit is implemented, such that the best efforts time period is extended only tip to the time limit even if the missing message has not been received. Therefore, at 1105, a determination is made whether an extension of the best efforts time limit would exceed a threshold. If not, then at 1106, the best efforts time period can be extended. If, however, the extension of the best efforts time limit would exceed a threshold, then the process proceeds to 1108 to proceed with processing of the messages.

The above description has provided the details of approaches for implementing an improved resequencer, along with related mechanisms and processes. For example, a process and mechanism was described for specifying sequence information for a set of messages.

The present invention(s) may be employed in any suitable computing architecture. For example, the inventions may be applied to facilitate message delivery for systems that employ middleware or ones that implement an enterprise service bus. While examples of the inventions were described relative to resequencers, it is noted that that inventions should not be limited to resequencers unless claimed as such.

System Architecture Overview

Figure 12:
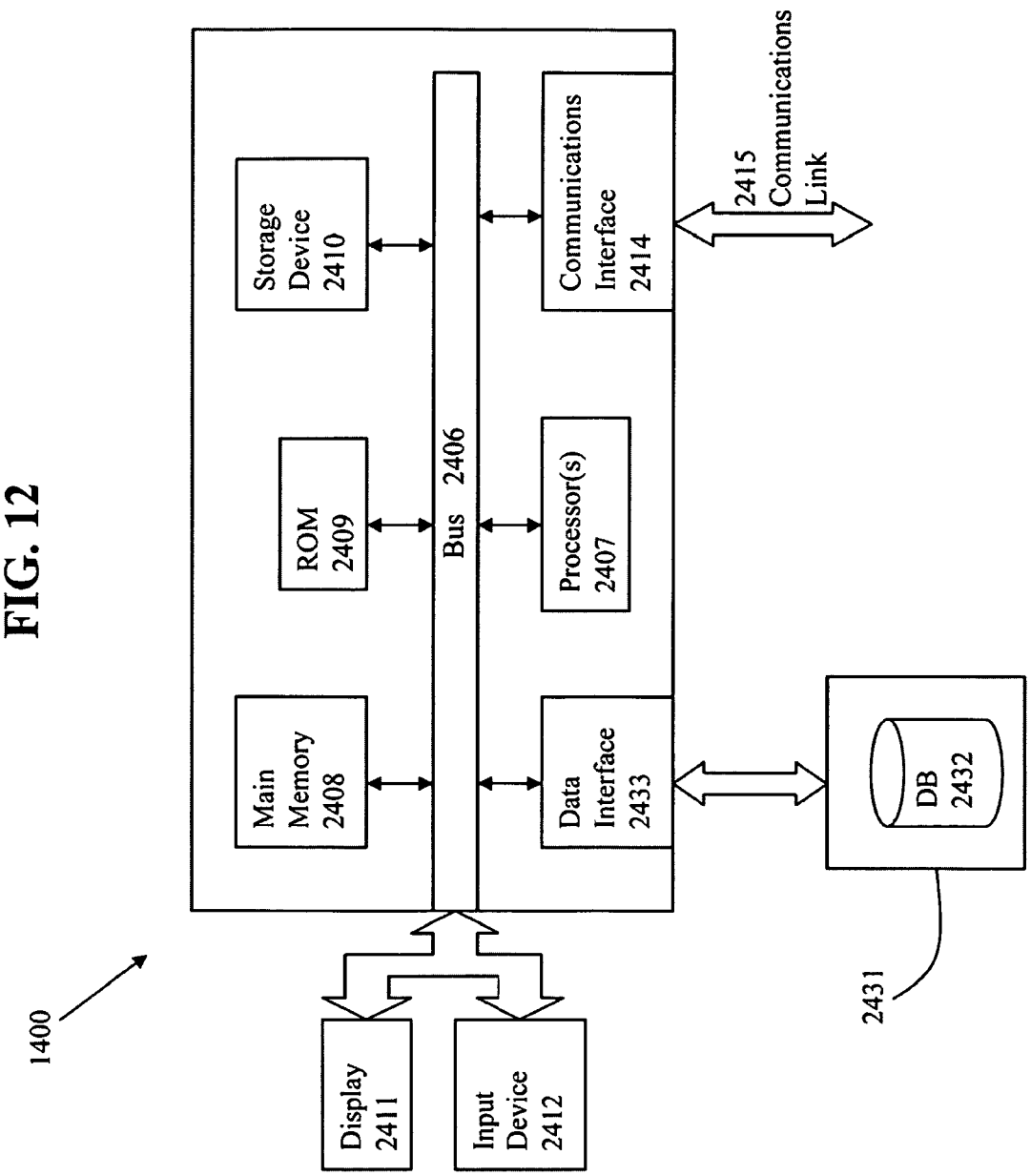
FIG. 12 shows an architecture of an example computing system with which the invention may be implemented.

FIG. 12 is a block diagram of an illustrative computing system 2400 suitable for implementing an embodiment of the present invention. Computer system 2400 includes a bus 2406 or other communication mechanism for communicating information, which interconnects subsystems and devices, such as processor 2407, system memory 2408 (e.g., RAM), static storage device 2409 (e.g., ROM), disk drive 2410 (e.g., magnetic or optical), communication interface 2414 (e.g., modem or Ethernet card), display 2411 (e.g., CRT or LCD), input device 2412 (e.g., keyboard), and cursor control.

According to one embodiment of the invention, computer system 2400 performs specific operations by processor 2407 executing one or more sequences of one or more instructions contained in system memory 2408. Such instructions may be read into system memory 2408 from another computer readable/usable medium, such as static storage device 2409 or disk drive 2410. In alternative embodiments, hard-wired circuitry may be used in place of or in combination with software instructions to implement the invention Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2407 for execution. Such a medium may take many forms, including but not limited to, non-volatile media and volatile media. Non-volatile media includes, for example, optical or magnetic disks, such as disk drive 2410. Volatile media includes dynamic memory, such as system memory 2408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 2400. According to other embodiments of the invention, two or more computer systems 2400 coupled by communication link 2415 (e.g., LAN, PTSN, or wireless network) may perform the sequence of instructions required to practice the invention in coordination with one another.

Computer system 2400 may transmit and receive messages, data, and instructions, including program, i.e., application code, through communication link 2415 and communication interface 2414. Received program code may be executed by processor 2407 as it is received, and/or stored in disk drive 2410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for determining a set of messages to process in a computing system, comprising:
   receiving a set of messages from a message producer;
   establishing a waiting period for the set of messages to be processed, wherein the set of messages are sequenced using a set of non-contiguous sequence identifiers such that it is unknown whether any messages are missing from the set of messages based on the set of non-contiguous sequence identifiers;
   using a processor to determine whether any messages of the set of messages arrive over a network to be processed during a pendency of the waiting period for the set of messages;
   re-starting the waiting period to wait for new messages if any messages of the set of messages arrive during the pendency of the waiting period wherein the waiting period is restarted for an arriving message even if it is unknown whether any messages of the set of messages are missing based on a non-contiguous sequence identifier of the arriving message;
   extending the waiting period if a first message arrives during the pendency of the waiting period that indicates that a second message is missing, wherein the indication that the second message is missing is based at least in part on text-based sequence information in the first message; and
   selecting all existing messages for the set of messages to be processed by the computing system if there are no new messages that arrive during the pendency of the waiting period.

2. The method of claim 1 in which the existing messages are sorted based on the non-contiguous sequence identifier.

3. The method of claim 1 which is implemented using a resequencer.

4. The method of claim 1 in which the waiting period is extended.

5. The method of claim 1, wherein the set of messages comprises a plurality of groups, wherein the messages are sorted for different consumers based at least in part upon the non-contiguous sequence identifier and a group identifier.

6. A computer program product that includes a non-transitory computer readable medium, the computer readable medium comprising a plurality of computer instructions which, when executed by a processor, cause the processor to execute a process for determining a set of messages to process in a computing system, the process comprising:
   receiving a set of messages from a message producer;
   establishing a waiting period for the set of messages to be processed, wherein the set of messages are sequenced using a set of non-contiguous sequence identifiers such that it is unknown whether any messages are missing from the set of messages based on the set of non-contiguous sequence identifiers;
   using a processor to determine whether any messages of the set of messages arrive over a network to be processed during a pendency of the waiting period for the set of messages;
   re-starting the waiting period to wait for new messages if any messages of the set of messages arrive during the pendency of the waiting period wherein the waiting period is restarted for an arriving message even if it is unknown whether any messages of the set of messages are missing based on a non-contiguous sequence identifier of the arriving message;
   extending the waiting period if a first message arrives during the pendency of the waiting period that indicates that a second message is missing, wherein the indication that the second message is missing is based at least in part on text-based sequence information in the first message; and
   selecting all existing messages for the set of messages to be processed by the computing system if there are no new messages that arrive during the pendency of the waiting period.

7. The computer program product of claim 6 in which the existing messages are sorted based on the non-contiguous sequence identifier.

8. The computer program product of claim 6 which is implemented using a resequencer.

9. The computer program product of claim 6 in which the waiting period is extended.

10. The computer program product of claim 6, wherein the set of messages comprises a plurality of groups, wherein the messages are sorted for different consumers based at least in part upon the non-contiguous sequence identifier and a group identifier.

11. A system for determining a set of messages to process in a computing system, comprising:
   means for receiving a set of messages from a message producer
   means for establishing a waiting period for the set of messages to be processed by a computing system, wherein the set of messages are sequenced using a set of non-contiguous sequence identifiers such that it is unknown whether any messages are missing from the set of messages based on the set of non-contiguous sequence identifiers;
   means for using a processor to determine whether any messages of the set of messages arrive over a network to be processed during a pendency of the waiting period for the set of messages;
   means for re-starting the waiting period to wait for new messages if any messages of the set of messages arrive during the pendency of the waiting period, wherein the waiting period is restarted for an arriving message even if it is unknown whether any messages of the set of messages are missing based on a non-contiguous sequence identifier of the arriving message;
   means for extending the waiting period if a first message arrives during the pendency of the waiting period that indicates that a second message is missing, wherein the indication that the second message is missing is based at least in part on text-based sequence information in the first message; and
   means for selecting the existing messages for the set of messages to be processed by the computing system if there are no new messages that arrive during the pendency of the waiting period.

12. The system of claim 11 in which the existing messages are sorted based on the non-contiguous sequence identifier.

13. The system of claim 11 in which the system is implemented as a resequencer.

14. The system of claim 11 in which the waiting period is extended.

15. The system of claim 14, wherein the set of messages comprises a plurality of groups, wherein the messages are sorted for different consumers based at least in part upon the non-contiguous sequence identifier and a group identifier.

16. A method for determining a set of messages to process in a computing system, comprising:
   receiving a set of messages from a message producer;
   establishing a waiting period for a plurality of groups of messages to be processed by a computing system, wherein the waiting period is established on a per group basis, and wherein a group of messages of the plurality of groups of messages are sequenced using a set of non-contiguous sequence of identifiers such that it is unknown whether any messages are missing from the group of messages based on the set of non-contiguous sequence identifiers;
   for the group of messages:
   using a processor to determine whether any messages of the group arrive over a network to be processed during a pendency of the waiting period;
   re-starting the waiting period to wait for new messages if any messages of the group of messages arrive during the pendency of the waiting period, wherein the waiting period is restarted for an arriving message even if it is unknown whether any messages of the group of messages are missing based on a non-contiguous sequence identifier of the arriving message;
   extending the waiting period if a first message arrives during the pendency of the waiting period that indicates that a second message is missing, wherein the indication that the second message is missing is based at least in part on text-based sequence information in the first message; and
   selecting all existing messages for the group to be processed by the computing system if there are no new messages for the group that arrive during the pendency of the waiting period.

17. The method of claim 16 which is implemented using a resequencer.

18. The method of claim 16 in which the waiting period is extended.

19. A computer program product that includes a non-transitory computer readable medium, the computer readable medium comprising a plurality of computer instructions which, when executed by a processor, cause the processor to execute a process for determining a set of messages to process in a computing system, the process comprising:
   receiving a set of messages from a message producer;
   establishing a waiting period for a plurality of groups of messages to be processed by a computing system, wherein the waiting period is established on a per group basis, and wherein group of messages of the plurality of groups of messages are sequenced using a set of non-contiguous sequence of identifiers such that it is unknown whether any messages are missing from the group of messages based on the set of non-contiguous sequence identifiers;
   for the group of messages:
   using a processor to determine whether any messages of the group arrive over a network to be processed during a pendency of the waiting period;
   re-starting the waiting period to wait for new messages if any messages of the group of messages arrive during the pendency of the waiting period, wherein the waiting period is restarted for an arriving message even if it is unknown whether any messages of the set of messages are missing based on a non-contiguous sequence identifier of the arriving message;
   extending the waiting period if a first message arrives during the pendency of the waiting period that indicates that a second message is missing, wherein the indication that the second message is missing is based at least in part on text-based sequence information in the first message; and
   selecting all existing messages for the group to be processed by the computing system if there are no new messages for the group that arrive during the pendency of the waiting period.

20. The computer program product of claim 19 which is implemented using a resequencer.

21. The computer program product of claim 19 in which the waiting period is extended.

22. A system for determining a set of messages to process in a computing system, comprising:
   a processor programmed for:
   receiving a set of messages from a message producer;
   establishing a waiting period for a plurality of groups of messages to be processed by a computing system, wherein the waiting period is established on a per group basis, and wherein group of messages of the plurality of groups of messages are sequenced using a set of non-contiguous sequence of identifiers such that it is unknown whether any messages are missing from the group of messages based on the set of non-contiguous sequence identifiers;
   for the group of messages:
   using a processor to determine whether any messages of the group arrive over a network to be processed during a pendency of the waiting period;
   re-starting the waiting period to wait for new messages if any messages of the group of messages arrive during a pendency of the waiting period, wherein the waiting period is restarted for an arriving message even if it is unknown whether any messages of the set of messages are missing based on a non-contiguous sequence identifier of the arriving message;
   extending the waiting period if a first message arrives during the pendency of the waiting period that indicates that a second message is missing, wherein the indication that the second message is missing is based at least in part on text-based sequence information in the first message; and
   selecting all existing messages for the group to be processed by the computing system if there are no new messages for the group that arrive during the pendency of the waiting period.

23. The system of claim 22 in which the system is implemented as a resequencer.

24. The system of claim 22 in which the waiting period is extended.

* * * * *

UNITED STATES PATENT AND TRADEMARK OFFICE
CERTIFICATE OF CORRECTION

PATENT NO. : 9,124,448 B2  
APPLICATION NO. : 12/418585  
DATED : September 1, 2015  
INVENTOR(S) : Singh et al.

Page 1 of 1

It is certified that error appears in the above-identified patent and that said Letters Patent is hereby corrected as shown below:

In the specification

Column 1, line 57, delete "that that" and insert -- that --, therefor.

Column 3, line 60, delete "them" and insert -- then --, therefor.

Column 4, line 30, delete "sub streams." and insert -- substreams. --, therefor.

Column 7, line 29, delete "balancing," and insert -- balancing. --, therefor.

Column 9, line 60, delete "tip" and insert -- up --, therefor.

Column 10, line 11, delete "that that" and insert -- that --, therefor.

Column 10, line 32, delete "invention" and insert -- invention. --, therefor.

Column 10, line 58, delete "PTSN," and insert -- PSTN, --, therefor.

In the claims

Column 11, line 30, claim 1, delete "period~wherein" and insert -- period, wherein --, therefor.

Column 13, line 15, claim 16, delete "wherein a group" and insert -- wherein group --, therefor.

Column 14, line 43, claim 22, delete "during a" and insert -- during the --, therefor.

Signed and Sealed this  
Seventh Day of June, 2016

Michelle K. Lee  
*Director of the United States Patent and Trademark Office*